(12) United States Patent
Rams

(10) Patent No.: US 6,600,925 B1
(45) Date of Patent: Jul. 29, 2003

(54) PROCESS FOR INTEGRATING CORDLESS TELEPHONE NETWORKS INTO CELLULAR MOBILE TELEPHONE NETWORKS

(75) Inventor: Wolfgang Rams, Neustadt/Wied (DE)

(73) Assignee: Detemobil Deutsche Telekom Mobilnet GmbH, Bonn (DE)

( * ) Notice: Subject to any disclaimer, the term of this patent is extended or adjusted under 35 U.S.C. 154(b) by 0 days.

(21) Appl. No.: 09/180,133

(22) PCT Filed: Apr. 30, 1997

(86) PCT No.: PCT/DE97/00885

§ 371 (c)(1),
(2), (4) Date: Jul. 12, 2000

(87) PCT Pub. No.: WO97/42785

PCT Pub. Date: Nov. 13, 1997

(30) Foreign Application Priority Data

May 2, 1996 (DE) .......................... 196 17 441

(51) Int. Cl.[7] ............................. H04Q 7/20; H04B 1/38; H04M 1/00
(52) U.S. Cl. .................. 455/445; 455/426; 455/432; 455/433; 455/435; 455/462; 455/552; 455/553; 455/555; 455/560
(58) Field of Search ................................ 455/432, 433, 455/435, 444, 445, 448, 456, 426, 462, 461, 552, 553, 555, 554, 560, 414, 417

(56) References Cited

U.S. PATENT DOCUMENTS 6,052,592 A * 4/2000 Schellinger et al. ........ 455/445
6,363,246 B1 * 3/2002 William et al. ............. 455/403

FOREIGN PATENT DOCUMENTS

| DE | 4344702 | 7/1995 | ............ H04Q/7/06 |
| EP | 660626 | 6/1995 | ............ H04Q/7/32 |
| WO | WO 93/18606 | 9/1993 | .......... H04M/11/00 |
| WO | 95/01074 | 5/1995 | ............ H04Q/7/38 |

OTHER PUBLICATIONS

"GSM und DECT in Dual–Mode–Handys," published in Funkschau, No. 3, pp. 22–27 (1996), With translation of Summary.

"GSM und DECT in Dual–Mode–Handys," Funkschau brochure, Heft 3, pp. 22–27 (1996).

* cited by examiner

*Primary Examiner*—Nay Maung
*Assistant Examiner*—Raymond Persino
(74) *Attorney, Agent, or Firm*—The Maxham Firm

(57) ABSTRACT

A process for integrating cordless telephone networks into cellular mobile phone networks by using dual-system terminals which support communication over both a cordless telephone network and a mobile phone network. In the process, the mobile phone network assigns each cordless telephone network usable by a specific subscriber an own Location Area, to which a subscriber specific call number is allocated. A continuous check is made whether the subscriber is in the Location Area of the cordless telephone network available to him, and if so, then any call incoming via the mobile phone network is completed optionally or automatically by a mobile phone switching center using the call number assigned to the Location Area.

20 Claims, 2 Drawing Sheets

PROCESS FOR INTEGRATING CORDLESS TELEPHONE NETWORKS INTO CELLULAR MOBILE TELEPHONE NETWORKS

BACKGROUND

1. Field of the Invention

The present invention concerns a method of integrating cordless telephone networks, in particular those according to the DECT standard, into cellular mobile telephone networks, in particular GSM networks.

2. Discussion of Related Art

Known mobile telephone networks, for example, according to the GSM standard, are provided for use with devices permanently installed in vehicles or compact mobile hand units. Cordless telephones according to the DECT standard operated in public switched telephone networks are also known. So-called mobile service switching centers, MSC, serve as mobile telephone exchanges according to the GSM standard, supporting the mobility of the mobile stations in addition to the functionalities of normal telephone exchanges. A special mobility management, MM, is used here.

Concepts have already been proposed, in some cases with specifics, where a DECT system is connected to a GSM system on the supply end, that is, over the air interface (interface between the exchange and the base station) or an ISDN connection. However, achieving a supply-side connection between a GSM network and a DECT network requires extensive specification work and development work and cannot be accomplished within a short period of time. If it were possible to rely on existing components for the network connection, implementation time would be short.

German patent application 4,344,702 describes a method and an arrangement for alternate operation of a mobile station over a cellular mobile telephone system and a cordless system of a public switched telephone network (PSTN). This is mainly for call forwarding for the case when an attempted call to a subscriber over the mobile telephone network does not go through. An alternative calling number is provided so that the forwarded call can be switched to it when the subscriber cannot be reached at his original number. A disadvantage of this method is the time-consuming localization of the mobile telephone subscriber associated with rerouting the call. Only in the case when the subscriber cannot be reached is the call forwarded to a specified DECT network.

International patent application WO A 93 0174 concerns a method of establishing a calling connection in GSM mobile telephone networks, where a cordless telephone system is tied into the GSM network, in the sense of a substitute for base transceiver stations (BTS) and base station controls (BSC). The base station of the cordless telephone network is tied into the mobile telephone network over a mobile exchange and therefore it functions like a base transceiver station of the mobile telephone network. If a mobile subscriber is within the region supplied by his own cordless telephone network, a request for a connection for this mobile telephone subscriber is automatically sent to the cordless telephone network. Thus, in principle, this is a call rerouting system, where calls to the mobile station are rerouted to the cordless telephone unit if the mobile telephone subscriber is within the region supplied by this cordless telephone network. Furthermore, to implement this method, modifications of existing network components are necessary to gain access to the mobility management of the mobile telephone network.

European patent 660,626 concerns a multi-mode cellular telephone which is capable of working together with two or more different mobile communications systems. The mobile station here monitors the signals of the various mobile telephone networks and switches automatically to the network supplying the best quality or the least expensive possible connection, or both.

SUMMARY OF THE INVENTION

A primary purpose of the present invention is to provide a method of integrating cordless telephone networks into cellular mobile telephone networks which will make it possible to provide service for subscribers directly over the more favorable network for each subscriber whenever possible.

Assuming almost complete coverage by a GSM network, it is possible according to the present invention to make the GSM internal mobility management function accessible to the DECT network over the GSM air interface.

The basic idea of the present invention is that a subscriber having a dual-system mobile station can always be reached in the more favorable network at any given time and can be called there directly by having the mobile station constantly check on whether the subscriber is in an area serviced by a DECT network, starting first from GSM operation. If this is the case, the mobile station will also check on whether the subscriber is authorized for access to the respective DECT network. If this condition is also met, the mobile station initiates a location update procedure so that the GSM network can determine the instantaneous location area of the subscriber.

After the location update has been performed successfully, the mobile station can go into the corresponding DECT mode. If a call then arrives for the subscriber, the subscriber's instantaneous location is compared with previously stored location information correlated with the respective calling numbers of individual DECT networks. The exchange (MSC) of the GSM network then "knows" that the subscriber can be reached through the respective DECT network and initiates a handshake procedure with the assistance of the GSM mobility management directly to the calling number of the respective DECT network. Outgoing calls by the subscriber are handled directly over the DECT network. According to this invention, private DECT systems can be combined appropriately with GSM mobile telephone networks. Communication over a DECT network offers the subscriber some important advantages:

- high speech quality due to the cordless PSTN connection;
- high traffic density possible in a small space, no interference;
- lower calling costs for the subscriber because of fixed system rates.

Another advantage is the full integration of any DECT networks into the GSM network with only minor modifications to the networks and mobile stations. Cellular telephone technology is already available, and the supply-side standardization is concluded except for a few areas.

The areas supplied by DECT networks are regarded as islands in the GSM network. The islands have GSM service but they also offer the possibility of utilizing the less expensive and higher quality DECT technology. If subscribers have access to these DECT networks (depending on the subscriber profile, multiple islands at different locations are also possible), these subscribers can use the DECT network. If a subscriber wanted to use both networks in the past, he would need two mobile stations, a GSM-compatible unit and a DECT-compatible unit. Because of the possible multitude of islands, it is impossible to implement ordinary call forwarding to an unknown location, so the present invention provides for the GSM network to be informed of the instantaneous location of a subscriber in the form of an entry in the home location register (HLR).

As with the GSM network, the mobile station must report a change in location to the HLR of the GSM network as soon as it detects such a change. In that way the network will know the specific location area of the subscriber. The HLR information about the subscriber's location must then be correlated with a calling number assigned to that location area in order to address a call to the subscriber accordingly. The prerequisite for utilizing the existing GSM infrastructure without modification thereof is that the DECT networks can be correlated with a characteristic location area. Then a corresponding calling number is connected to this location area in conjunction with a customer.

With regard to the location update procedure and notification of the HLR of the instantaneous location of the subscriber, various scenarios are conceivable:

a) actually using the location update procedure known from GSM, b) establishing or disconnecting call forwarding (call forwarding unconditional), c) short message to a newly established intelligent network element to which the new calling number is relayed, d) calling an intelligent network element to be established anew, to which the new calling number is then relayed by DTMP tones, e) modifying the GSM specifications to specifically support the DECT-GSM roaming functionality.

Thus the mobile station checks constantly to determine whether it is in an area serviced by a cordless telephone network. This is the prerequisite for cordless telephone operation. If the mobile station is in a region serviced by a cordless telephone network and the subscriber is allowed in the respective network, a location update procedure is initiated by the mobile station in the mobile telephone network to determine the subscriber's location. The subscriber's current location is entered into the home location register (HLR with GSM) of the mobile telephone network and updated constantly. After successfully updating the location, the mobile station switches automatically or by choice from mobile telephone operation to cordless telephone operation.

The subscriber's acceptability in the cordless telephone network can be tested by attempting to establish a connection or by appropriate system codes such as those also used in the mobile telephone area. Each cordless telephone network to which the subscriber has access is assigned its own calling number which the mobile telephone network already knows and by which the subscriber can be reached in the respective cordless telephone network.

Calls arriving over the cordless telephone network are sent directly to the mobile station if the subscriber is within the area serviced by the cordless telephone network.

The connection between the mobile telephone network and the cordless telephone network is established by means of the mobility management module with GSM networks, with any desired number of possible integratable cordless telephone networks being possible.

BRIEF DESCRIPTION OF THE DRAWING

The objects, advantages, and features of the invention will be more readily perceived from the following detailed description, when read in conjunction with accompanying drawing, in which.

DETAILED DESCRIPTION OF THE PREFERRED EMBODIMENTS

Figure 1:
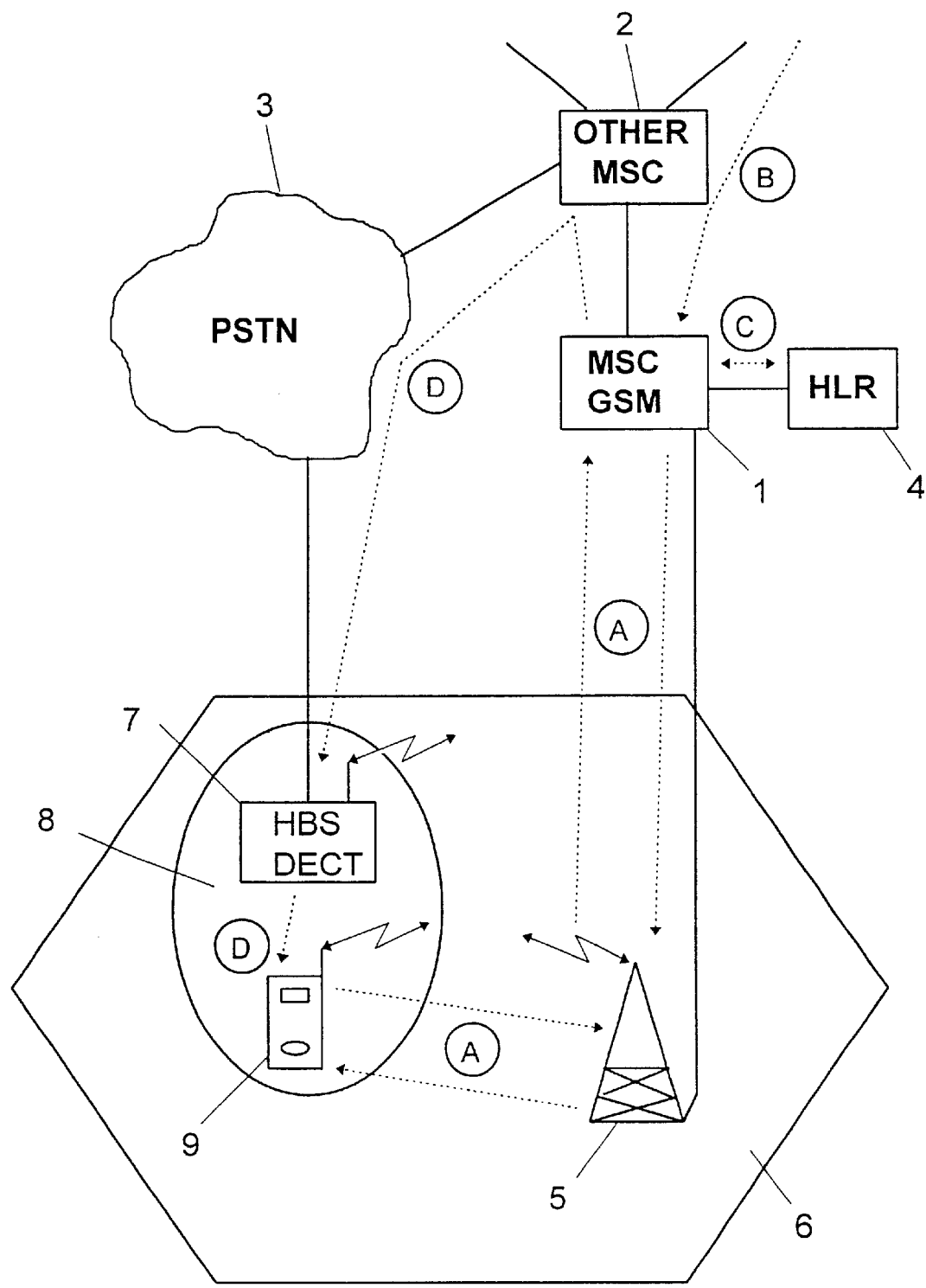
FIG. 1 is a schematic diagram of integration of the DECT network into the GSM network and the individual steps in establishing a connection.

FIG. 1 shows in diagram form parts of a GSM mobile telephone network, with a mobile services switching center (MSC) 1, which is connected to other mobile services switching centers 2. A connection to a public switched telephone network (PSTN) 3 is established over certain mobile services switching centers 2. Mobile services switching center 1 has access to the home location register 4 where subscriber information is stored. Switching center 1 services one (or more) base transceiver stations (BTS) 5 which in turn supply wireless signals to a wireless cell 6. Within wireless cell 6 there is, for example, a DECT cordless telephone network with a base station (HBS) 7, which supplies wireless signals for a region (location area) 8. Base station 7 is connected to public switched telephone network 3.

A mobile station 9 is within the wireless cell 6 and checks constantly to determine whether it is in a location area 8 supplied by a cordless telephone network. This is the prerequisite for cordless telephone operation. If the mobile station 9 is in a location area 8 serviced by a cordless telephone network and if the subscriber is allowed in the respective cordless telephone network, the mobile station 9 in the mobile telephone network will initiate a location update procedure according to step A to determine the instantaneous location of mobile station 9 and identify the location area 8 with respect to the GSM network. The instantaneous location of mobile station 9 is stored as an entry in home location register 4 (HLR with GSM) of the mobile telephone network and is updated constantly.

Then when a call for the subscriber arrives over the GSM network according to step B, the current location of the subscriber (mobile station 9) is compared with location information previously stored in home location register 4 according to step C, that location information being correlated with appropriate calling numbers of individual DECT networks. The switching center 1 of the GSM network now knows that the subscriber can be reached through the corresponding DECT network and it initiates the establishment of a connection directly with the calling number of the respective DECT base station with the help of GSM mobility management. Thus according to step D, the connection is established via MSC 1 and via public switched telephone network 3 to DECT home base station 7 and finally to mobile station 9. Outgoing calls from the subscriber are also handled directly over the DECT network.

Figure 2:
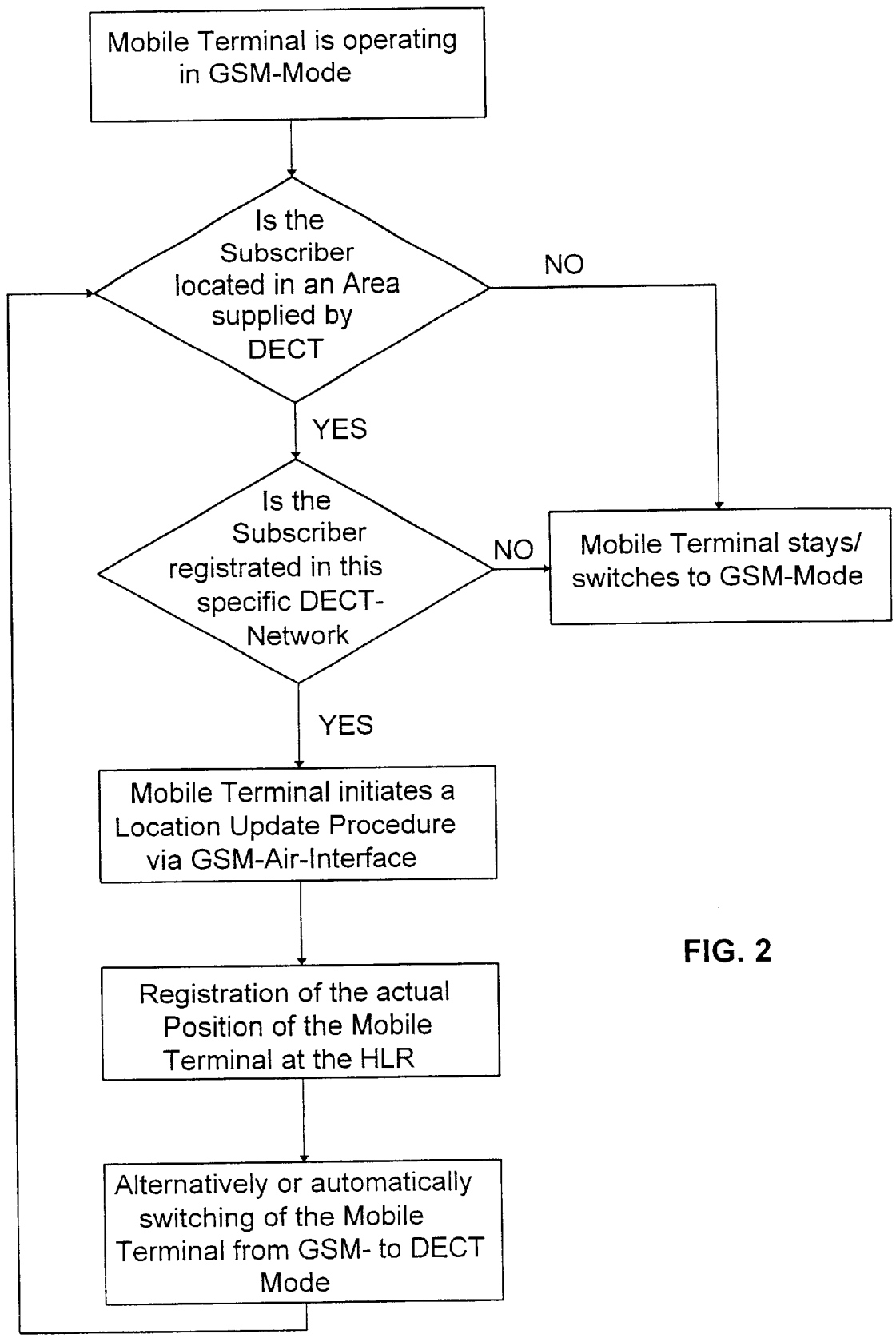
FIG. 2 is a flow chart of switching the mobile station between GSM and DECT modes in the method according to the present invention.

According to FIG. 2, a subscriber with a dual system mobile station is first in GSM mode and the mobile station is constantly checking to determine whether or not the subscriber is in an area serviced by a DECT network. If he is not in an area serviced by a DECT network, the mobile station remains in GSM mode. If the subscriber is in an area serviced by a DECT network, the mobile station continues to check on whether or not the subscriber is authorized to have access to the respective DECT network. If this condition is not met, the mobile station remains in GSM mode.

However, if this condition is met, the mobile station will initiate a location update procedure via GSM air interface so the GSM network can determine the subscriber's instantaneous location area. After successfully performing the location update, an entry is made in the HLR regarding the instantaneous location of the mobile station. The mobile station may then switch automatically or by choice from GSM mode to DECT mode and can then be reached over the DECT network. A check is also being performed constantly in DECT mode to determine whether or not the subscriber is still in the location area serviced by the DECT network.

In view of the above description it is likely that modifications and improvements will occur to those skilled in this technical field which are within the scope of the invention. The invention is to be limited only by the spirit and scope of the accompanying claims and their equivalents.

What is claimed is:

1. A method of integrating cordless telephone networks each capable of carrying a call independently of a cellular mobile network into the cellular mobile telephone networks, the cellular mobile telephone network using dual system mobile stations which support communication over the cordless telephone network as well as over the mobile telephone network, the cordless telephone network routing calling via a public network exchange and the mobile telephone network routing calls via mobile switching centers, the method comprising:

assigning, with the mobile telephone network, a characteristic location area to each cordless telephone network that can be used by each of a plurality of subscribers, each subscriber being qualified to use at least one cordless telephone network;

assigning a subscriber-specific calling number to each location area;

performing a check constantly to determine whether or not the subscriber is in the location area of a cordless telephone network which the subscriber is authorized to use;

initiating, by the mobile station in the mobile telephone network, a location update procedure if the mobile station is in a location serviced by one of the cordless telephone networks and the subscriber is entitled to use the respective network; and establishing a connection automatically or by choice over either a cordless telephone network routed by a public switched telephone network or over the mobile telephone network when there are incoming calls over the mobile telephone network by a mobile services switching center on the basis of the calling number assigned to that location area.

2. The method according to claim 1, wherein an instantaneous location of the subscriber is entered in the home location register of the mobile telephone network and is updated constantly.

3. The method according to claim 1 or 2, wherein the mobile station selectively switches automatically or by choice from mobile wireless mode to cordless telephone mode after a successful location update.

4. The method according to claim 3, wherein the authorization of the subscriber in the cordless telephone network is checked by attempting to establish a connection or by appropriate system codes.

5. The method according to claim 3, and further comprising assigning a separate calling number to each cordless telephone network to which the subscriber is authorized to have access, said calling number being known to the mobile telephone network, so that the subscriber can be reached at that number in the respective cordless telephone network.

6. The method according to claim 3, and further comprising establishing a connection between a mobile telephone network and a cordless telephone network by means of the mobility management module of the mobile telephone network.

7. The method according to claim 3, wherein the mobile telephone network is a GSM mobile telephone network.

8. The method according to claim 3, wherein the cordless telephone network is a DECT cordless telephone network.

9. The method according to claim 1 or 2, wherein the authorization of the subscriber in the cordless telephone network is checked by attempting to establish a connection or by appropriate system codes.

10. The method according to claim 9, and further comprising assigning a separate calling number to each cordless telephone network to which the subscriber is authorized to have access, said calling number being known to the mobile telephone network, so that the subscriber can be reached at that number in the respective cordless telephone network.

11. The method according to claim 9, and further comprising establishing a connection between a mobile telephone network and a cordless telephone network by means of the mobility management module of the mobile telephone network.

12. The method according to claim 1 or 2, and further comprising assigning a separate calling number to each cordless telephone network to which the subscriber is authorized to have access, said calling number being known to the mobile telephone network, so that the subscriber can be reached at that number in the respective cordless telephone network.

13. The method according to claim 12, wherein incoming calls over the cordless telephone network are sent directly to the mobile station as long as the subscriber is within the service area of the cordless telephone network.

14. The method according to claim 12, and further comprising establishing a connection between a mobile telephone network and a cordless telephone network by means of the mobility management module of the mobile telephone network.

15. The method according to claim 1 or 2, wherein incoming calls over the cordless telephone network are sent directly to the mobile station as long as the subscriber is within the service area of the cordless telephone network.

16. The method according to claim 15, and further comprising establishing a connection between a mobile telephone network and a cordless telephone network by means of the mobility management module of the mobile telephone network.

17. The method according to claim 1 or 2, and further comprising establishing a connection between a mobile telephone network and a cordless telephone network by means of the mobility management module of the mobile telephone network.

18. The method according to claim 1 or 2, wherein there may be any desired number of possible integratable cordless telephone networks.

19. The method according to claim 1 or 2, wherein the mobile telephone network is a GSM mobile telephone network.

20. The method according to claim 1 or 2, wherein the cordless telephone network is a DECT cordless telephone network.

* * * * *

UNITED STATES PATENT AND TRADEMARK OFFICE
CERTIFICATE OF CORRECTION

PATENT NO. : 6,600,925 B1  
DATED : July 29 2003  
INVENTOR(S) : Wolfgang Rams

It is certified that error appears in the above-identified patent and that said Letters Patent is hereby corrected as shown below:

<u>Title page,</u>
Item [73], Assignee, change "Detemobil Deutsche Telekom Mobilnet GmbH," to -- T-Mobile Deutschland GmbH --.

Signed and Sealed this

Twenty-ninth Day of June, 2004

JON W. DUDAS  
*Acting Director of the United States Patent and Trademark Office*